Dec. 9, 1924.

L. R. MARYOTT 1,518,664

STOCK FEEDING APPARATUS

Filed Nov. 2, 1921

Inventor
Lucius R. Maryott

By Lancaster and Allwine

Attorneys

Dec. 9, 1924.                                              1,518,664
L. R. MARYOTT
STOCK FEEDING APPARATUS
Filed Nov. 2, 1921           5 Sheets-Sheet 2

Dec. 9, 1924.

L. R. MARYOTT 1,518,664

STOCK FEEDING APPARATUS

Filed Nov. 2, 1921     5 Sheets-Sheet 4

Inventor
Lucius R. Maryott
By Lancaster and Allwine
Attorneys

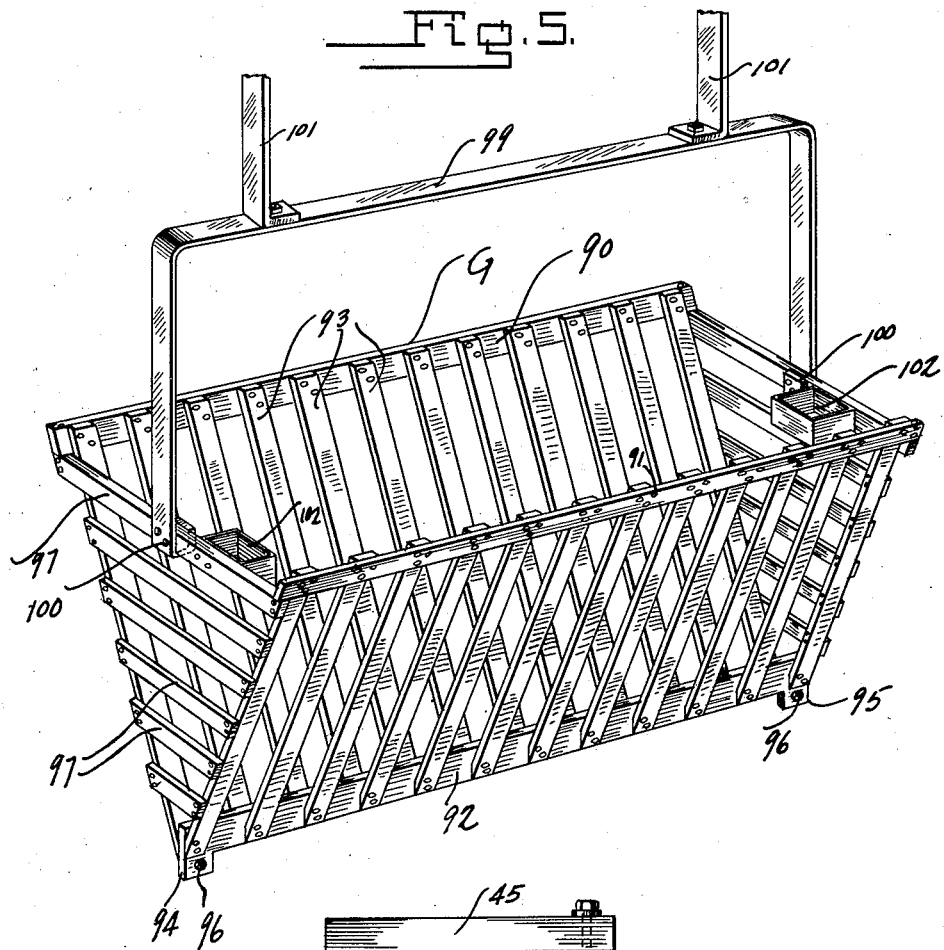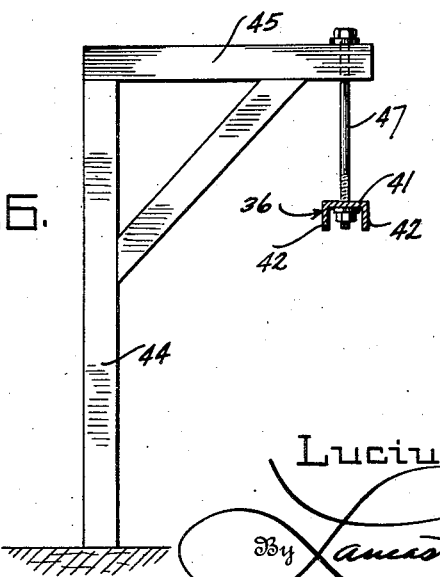

Patented Dec. 9, 1924.

1,518,664

UNITED STATES PATENT OFFICE.

LUCIUS R. MARYOTT, OF ROBERTS, MONTANA.

STOCK-FEEDING APPARATUS.

Application filed November 2, 1921. Serial No. 512,212.

*To all whom it may concern:*

Be it known that I, LUCIUS R. MARYOTT, a citizen of the United States, residing at Roberts, in the county of Carbon and State of Montana, have invented certain new and useful Improvements in Stock-Feeding Apparatus, of which the following is a specification.

This invention relates to improvements in stock feeding apparatus.

The invention is primarily provided with the end in view of facilitating the transportation of food from a supply source to a stock feeding location.

An object of the invention is the provision of a stock feeding apparatus designed for use in connection with a cattle enclosure, such as a barn, shed or the like, in which a plurality of stalls are provided, and includes movable mangers for transportation intermediate said stalls and a food supply source.

A further object of the invention is the provision of a stock feeding apparatus of the above described character which includes portable mangers capable of being moved into or outside of a cattle feeding enclosure; providing a sanitary arrangement in that the mangers can be aired, washed, or sterilized exteriorly of the stock enclosure and in the sunshine; further providing a desirable arrangement for use in exhibitions, stock shows and the like, wherein the entire passageway in front of the stalls can be used by spectators and observers, due to the shifting nature of the mangers and thus providing an unobstructed view of the animals in the various stalls.

A further object of the stock feeding apparatus is the provision of the above mentioned portable mangers, used in connection with a stock enclosure, such as a barn, shed or the like, the mangers being movable exteriorly of the enclosure to a food supply source, and by this arrangement reducing the fire hazard within the stock enclosure, due to the fact that the highly combustible feeds can be disposed remote from the enclosure, in suitable silos, granaries, stacks and the like.

Other objects and advantages will be apparent during the course of the following detailed description.

In the accompanying drawings, forming a part of this specification, and wherein similar reference characters designate corresponding parts throughout the several views, Figure 1 is a perspective view of a cattle enclosure, having various food supply sources located exteriorly thereof, and showing the improved apparatus as used in connection with the enclosure for transporting food from the supply sources thereto.

Figure 5 is a perspective view of a feed cradle or manger which may be used in connection with the stock feeding apparatus.

Figure 6 is a side elevation of a portion of the supporting means for the manger.

Figure 1:
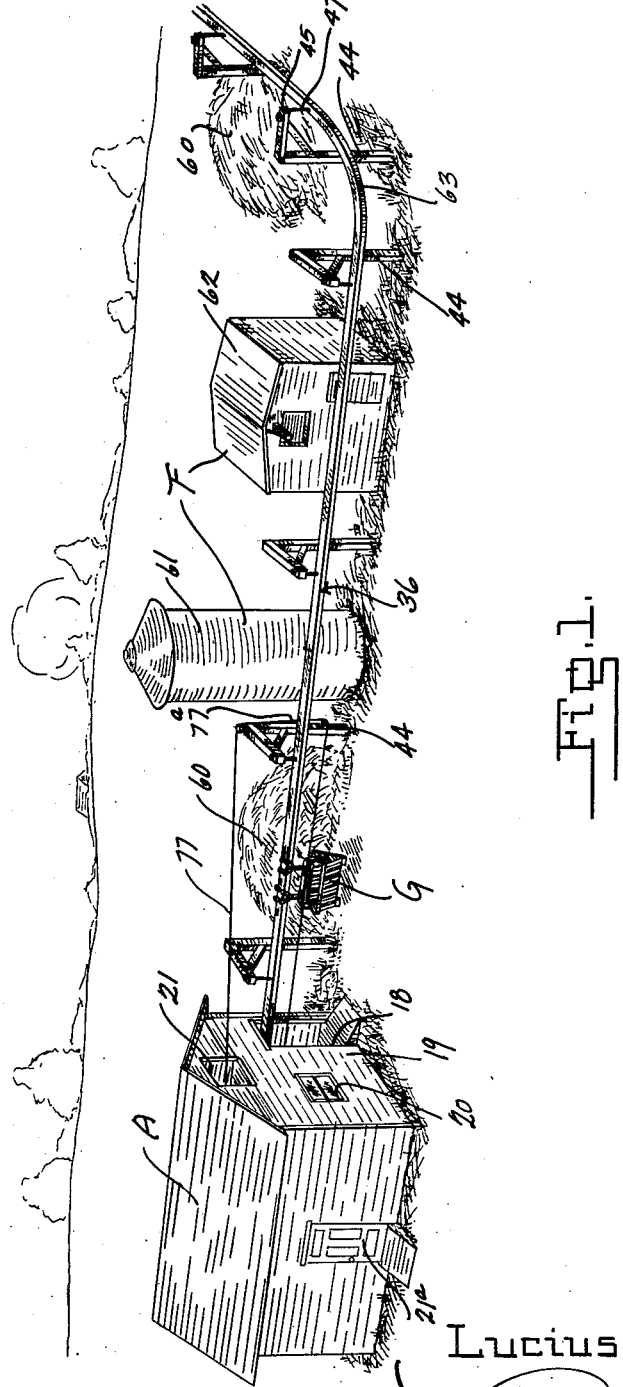

In the drawings, wherein for purposes of illustration is shown a preferred embodiment of my invention, the letter A designates a stock enclosure having the stalls B placed therein. Suitable mangers C of special formation are movably supported, as by means D whereby the same may be moved from in front of the various stalls to a loading apparatus conveniently disposed within the enclosure A, or transported to a food supply source or sources F, disposed exteriorly of the enclosure A.

The stock enclosure A may, of course, be of any approved shape or design. For purposes of illustration, however, a barn shaped enclosure A has been shown, substantially of rectangular appearance, including a lower room or chamber 10 and an upper chamber 11, respectively provided for stalls and a food supply source, such as a hay mow. The lower chamber or floor 10 is provided with the symmetrically disposed stalls B, having the partitions 12 disposed intermediate adjacent stalls. A forward railing 13 is provided longitudinally in the lower room and supported by the various posts 14 in each of the stalls B. The railing 13 is so placed in the chamber 10, as to provide a longitudinal passageway 16 upon one side of the enclosure A, said passageway 16 preferably having a relatively large door opening 18 in one side 19 of the barn or enclosure A. Various windows 20 may be positioned in the sides of the enclosure A, and a door 21ª may be positioned for entrance directly to the rear of the stalls B. The upper or hayloft chamber 11 is preferably provided with suitable openings 21 in the ends of the enclosure A. The flooring 22 separating the upper and lower enclosure chambers 10 and 11 is provided with an opening 23 and which will be subsequently mentioned.

Figure 2:
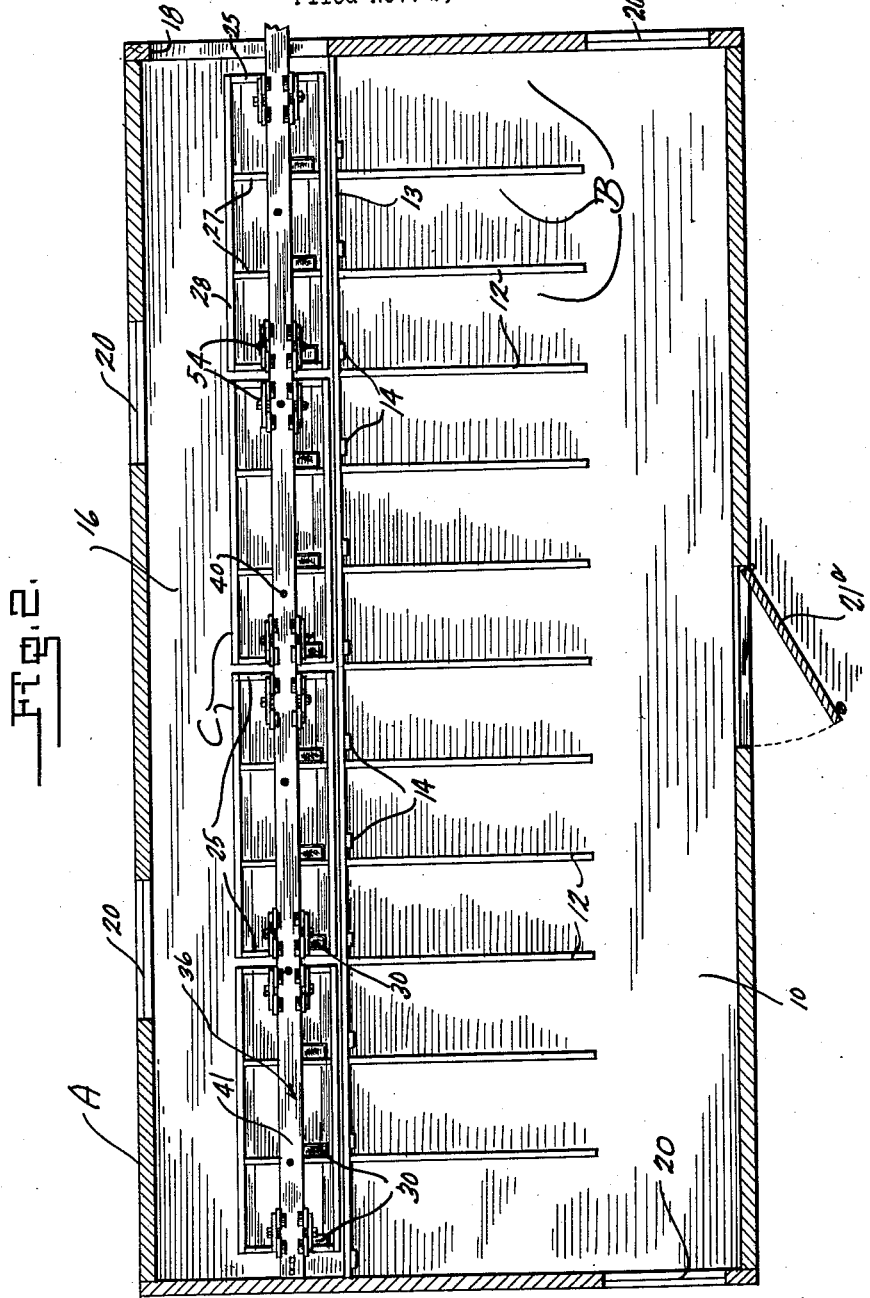
Figure 2 is a plan view of the interior arrangement of the stock enclosure.
Figure 3:
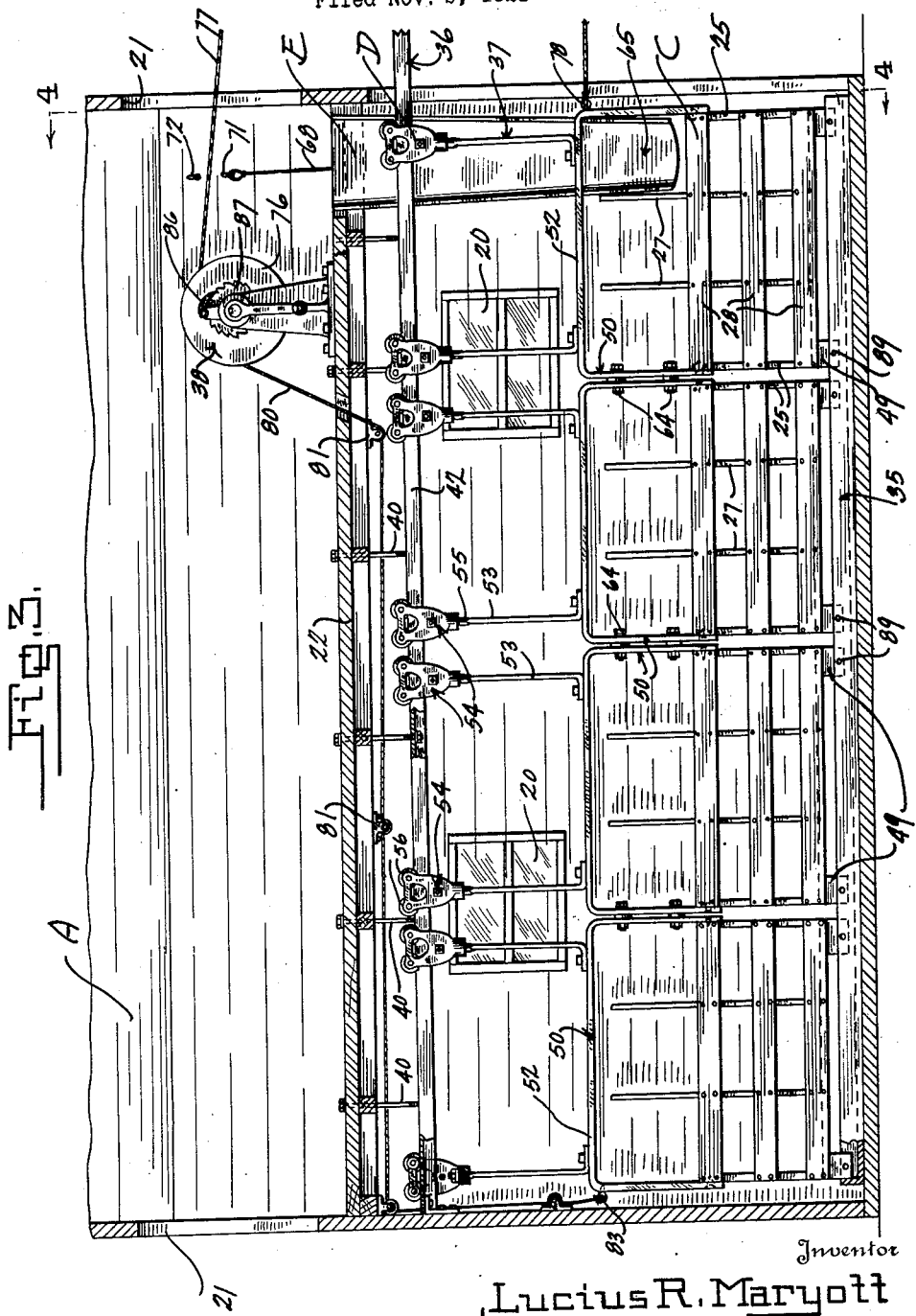
Figure 3 is a vertical cross sectional view taken through the stock enclosure and showing the improved stock feeding apparatus as used interiorly thereof.

The mangers C are of novel formation, each manger primarily adapted for taking care of a plurality of stalls which is the preferred arrangement as illustrated in Figure 3. These mangers C include the ends 25, a bottom 26, partitions 27 parallel with the ends 25 and adapted to subdivide the interior of the individual mangers C in order to conform to the width of the stalls B, and as is clearly indicated in Figure 2 of the drawings. The ends 25 and partitions 27 are held together by suitable spaced bars 28. Suitable feed boxes 30 are positioned in each subdivision of the mangers C which are provided, as in the ordinary arrangement, for receiving grain or the like.

Referring now to the means D for portably mounting the various mangers C, the same generically include a lower railing 35, an overhead railing 36, manger supporting means 37, and a windlass arrangement 38.

The lower or ground rail 35 is channel shaped, and is preferably provided for disposition upon the floor of the enclosure A and in the passageway 16 directly in front of the various stalls B. The upper or overhead railing 36 is likewise of channel formation and suitably suspended within the enclosure A by the supporting bolts 40 detachably and adjustably mounted downwardly through the hay loft flooring 22 and engaging the bight portion 41 of the channel shaped rail 36, in such manner that the side legs 42 of said rail 36 extend downwardly. The overhead railing 36, of course, extends exteriorly of the enclosure A, since it is one of the purposes of this invention to provide the mangers C as being portably mounted to move exteriorly of the enclosure A. In order to support the railing 36 exteriorly of the enclosure A, suitable supporting posts 44 are provided adjacent the food supply sources F, each having an upper arm 45 extending outwardly to receive the detachable and adjustable supporting bolts 47, similar in all respects to the supporting bolts 40, and which likewise engage the bight portion 41 of the railing 36, in order to properly suspend the same. It is preferred that the overhead railing 36 slope downwardly from the most remote of the food supply sources F, and which downward slope continues at a slight angle to the horizontal, directly into the enclosure A as is clearly illustrated in Figure 3. This slope may be varied by adjustment of the suspending bolts 40 and 47. It is preferred that the overhead railing 36 be suspended directly above and in alignment with the ground railing 35.

Each manger C is provided upon the bottom 26 thereof with a pair of plates 48 disposed adjacent the ends 25, and in such manner that apertured lugs 49 depend from these plates 48, said apertured lugs 49 being provided for disposition in the groove provided by the ground rail 35. Substantially U-shaped handles or brackets 50 are provided upon each of the mangers C, and extending upwardly therefrom upon the longitudinal center thereof, being attached as at 51 to the outside surfaces of the end pieces 25. Each rail 52 on a handle 50 is provided with a pair of upwardly extending bars 53, adjacent the ends of its manger C, and attached in detachable and rigid manner upon the upper surface of said rail 52. A clevis 54 is swivelly connected as at 55 to each upper end of the bar 53 and suitable runners 56 are provided upon the free ends of the arms of the clevis, which are adapted for engaging the upper surface of the bight portion 41 of the overhead rail 36, and for slidably supporting the feeding racks or mangers C from said overhead railing 36. A bolt arrangement 57 may be provided for maintaining the arm of the clevis 54 in a position whereby the rollers 56 will engage the overhead railing 36, without liability of displacement.

The food supply source F disposed exteriorly of the enclosure A may include a series of hay stacks 60; a silo 61; granary 62; or any other food supply or storage places consistent with the type of stock for which the improved feeding apparatus is used. The placing of the various food supply sources, may be such as to necessitate a curve or bending 63 in the overhead rail 36. The swivel mounting of the clevis members 54 to the supporting rods 53 will permit easy riding of the various mangers C when going about this curve portion 63 of the overhead rail 36. It is desirable that in enclosures where a great many cattle are disposed, that a plurality of mangers C be adapted for simultaneous movement to the food supply sources F. Consequently the various brackets or handles 50 of the mangers C have been detachably connected as by bolt structures 64, in order that any desired number of the mangers C may be attached for stock feeding purposes.

Figures 4, 7:
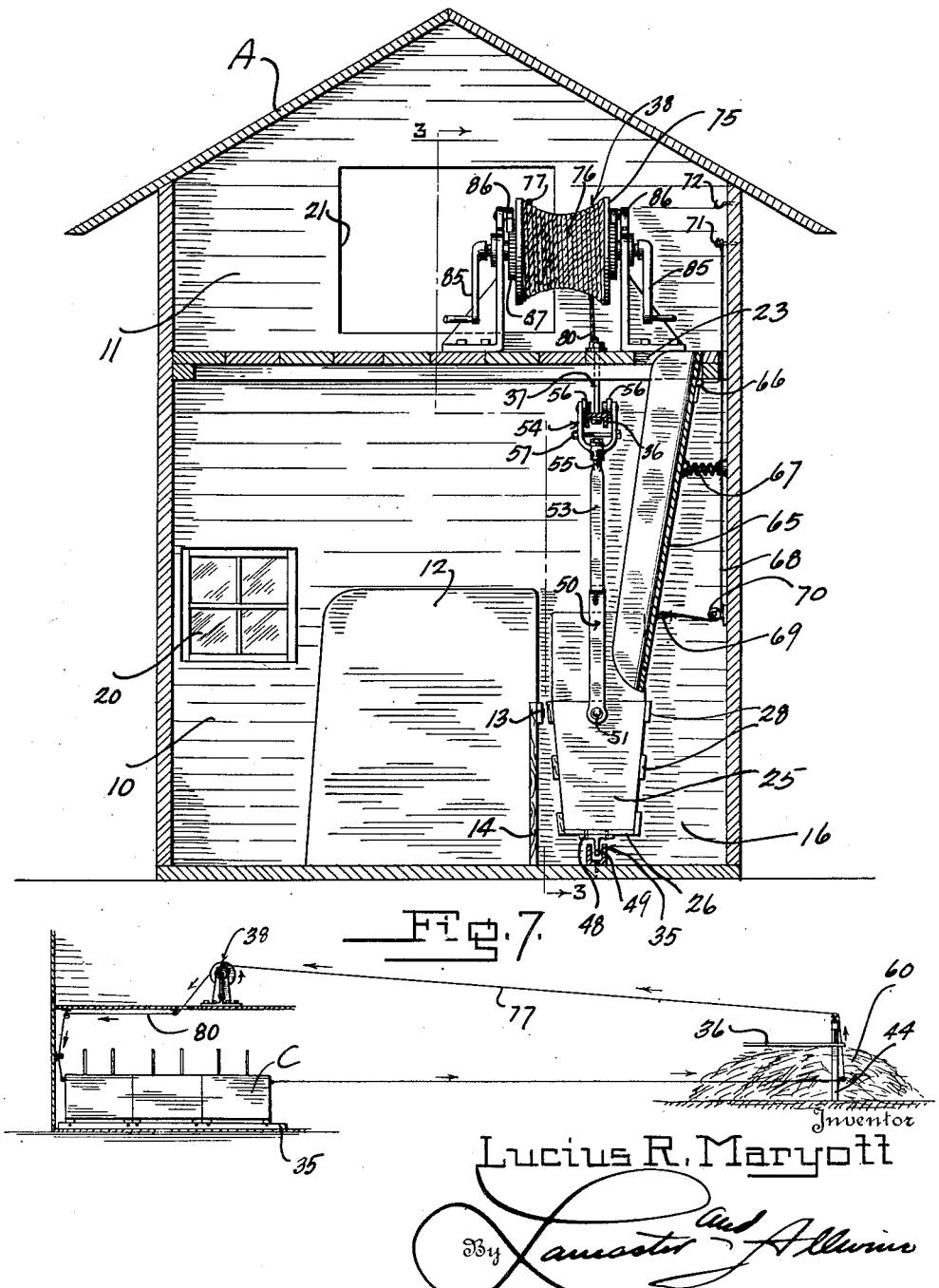
Figure 4 is a cross sectional view taken vertically through the stock enclosure and at right angles to the view illustrated in Figure 3; showing the stock feeding apparatus therein.
Figure 7 is a side elevation of the improved stock feeding apparatus, diagrammatically illustrating the manner in which food is transported directly from a supply source to a cattle enclosure.

The loading apparatus E preferably includes a long chute 65 adapted for vertical suspension downwardly from the communicating opening 23; being hingedly connected as at 66; whereby the spring 67 normally forces the lower end of said chute outwardly. A cable 68 is attached as at 69, adjacent the free end of the chute 65 and connected over a pulley 70, said cable 68 continuing upwardly in vertical manner to engage the lower and upper hooks 71 and 72 respectively. The chute 65 is in fact, provided whereby hay may be fed downwardly from the upper enclosure or chamber 11, in convenient manner for direct disposal into any of the subdivisions of any of the chambers C. The mangers C may, of course, be moved by means of the overhead and ground railings 36 and 35 respectively, until the desired manger C is disposed adjacent the chute 65. The chute 65 can then be swung outwardly by attaching the upper end of the cable 68 to the lower hook 71 and be held in the position illustrated in Figure 4, whereby hay or the like may be fed directly down into a desired subdivision of a particular manger C. When the filling of the mangers C has been effected, the chute 65 can be moved rearwardly into vertical position out of the way by attaching the upper end of the cable 68 to the upper hook 72.

The connected mangers C, can of course be manually moved over the overhead railing 36. However, it is desirable to provide the windlass apparatus 38 which will make moving of the mangers C relatively easy. This windlass arrangement includes a drum 75 upon which a cable 76 is wound. One end 77 of the cable 76 extends forwardly to be engaged about a plurality of pulleys upon a device 77ª, which may be attached to any of the supporting posts 44 adjacent a desired food supply source. The forwardly extending strand 77 of cable 76 is then returned and attached as by a staple 78 to the bracket 50 of the most forward manger C. A rearwardly extending strand 80 of cable 76 extends downwardly from the drum 75, which is detachably mounted upon the upper floor 22, and engages beneath a series of pulleys 81 suitably mounted on the under surface of the floor 22; said cable strand 80 extending to be attached as by a staple 83 to the bracket or handle 50 of the most rearwardly positioned manger C. Crank arms 85 are preferably mounted on each end of the drum 75 for rotation thereof, suitable pawls 86 and cooperating ratchet wheels 87 being provided upon each end of the drum 75, and for proper positioning of the mangers C in any desired location, and against liability of displacement.

In operation, it can readily be seen that as a crank 85 is turned for rotating the drum 75, the cable 76 will be wound and unwound thereon. Assuming the operator to move the mangers C from the feeding position, as illustrated in Figure 3, and to position them exteriorly of the enclosure A, the operation would be that of rotating the drum 75 so that the cable strand 77 would be wound upon the drum 75 and the strand 80 would correspondingly be fed out to compensate for winding up of the forward strand 77. This, as can readily be seen, would result in the connected mangers C being fed outwardly upon their overhead track 36; the moving of the same being terminated when said mangers have reached any desired food source. When in feeding position, the mangers C may be connected rigidly in place, by means of pins 89 engaging transversely in the legs of the ground rail 35 and to be inserted in the apertures of the various manger lugs 49. This will absolutely prevent lateral swaying of the mangers C as well as preventing longitudinal movement of the same with respect to their stalls B.

It is of course, optional what type of manger is used. In some instances, it will be desirable to use a special type of feed rack or manger G as when the cattle are free and not tied in the stall B. This manger G is a V-shaped structure including the upper side rails 90 and 91, and a bottom rail 92 extending longitudinally with the side rails 90 and 91. Suitable bars or strips 93 are connected in parallel relation between the upper rails 90 and 91 and the lower support 92. The ends of the supporting piece 92 are provided with downwardly extending lugs 94 and 95 upon the ends thereof, each having an aperture 96 therein. These apertures 96 are of course, for cooperation in the ground rails 35 and adapted to receive the retaining pins 89 above described. The ends of the rack G may comprise a plurality of horizontally disposed bars 97. The bracket 99 of U-shaped formation is connected to the topmost side bars 97, as by a foot structure 100; this bracket or handle portion 97 being similar in all respects to the bracket structure 50 above described for the preferred type of manger C. Suitable supporting legs 101 may be provided upon the upper surface of the bracket 99 as is clearly illustrated in Figure 5. The grain receiving boxes 102 may be provided on each end of the rack G.

From the foregoing it can be seen that an improved stock feeding apparatus has been provided, which will relieve many of the burdens and inconveniences now incident to the feeding of cattle and the like. I am of course, aware that it is old to provide containers operating upon overhead rails. However, I do not claim such broad idea, but merely the convenient and portable disposition of mangers in specified relation to cattle stalls, whereby they may be moved into and out of feeding relation therewith.

The apparatus is, of course, susceptible of various alterations, and I wish it to be understood that changes in the size, shape and arrangement of parts may be made to the form of the invention herein shown and described, without departing from the spirit of the invention or the scope of the appended claims.

I claim:

1. In a device of the class described, the combination with an enclosure having stalls therein, of an overhead trackway in front of said stalls, a ground trackway in alignment immediately below said overhead trackway, mangers having certain portions projecting to engage said ground trackway, means swivelly connecting said mangers to said overhead trackway, and means for moving said mangers over said trackways to position them in any desired location.

2. In a device of the class described, the combination with an enclosure providing a food supply loft therein and stalls therebelow, of a trackway extending forwardly of said stalls, a guide rail positioned below said trackway and extending longitudinally thereof, mangers suspended from the trackway for movement longitudinally of the trackway and held against transverse swinging movement by engagement with said guide rail, and cable means for movement of said mangers.

3. In a device of the class described, the combination with an enclosure having stalls therein and providing a passageway forwardly of said stalls, of a food supply loft upwardly in said enclosure above said stalls, a trackway carried by said enclosure at said loft, mangers slidably supported by said trackway within the passageway forwardly of said stalls, a windlass carried by said enclosure in said loft, a chute swingably carried by said enclosure for depositing food from said loft in said mangers, and cable means connecting said mangers to said windlass, said windlass upon operation being adapted to place said mangers in feeding position with said chute or out of said passageway.

4. In a device of the class described, the combination with an inclosure having stalls therein, of an overhead trackway in front of said stalls, a ground trackway in alinement immediately below said overhead trackway, mangers suspended from said overhead trackway for movement longitudinally thereof and having depending members for engaging said ground trackway to prevent transverse swinging of the mangers, and means for moving said mangers along said trackways to a desired location.

LUCIUS R. MARYOTT.